3,280,074
MONOTERTIARY-DIPRIMARY TRIAMINES AND THE USE THEREOF FOR CURING EPOXY RESINS
Kirtland E. McCaleb, Oakland, Calif., and Robert Nordgren, Minneapolis, and David Glaser, St. Paul, Minn., assignors to General Mills, Inc., a corporation of Delaware
No Drawing. Filed Aug. 2, 1961, Ser. No. 128,679
10 Claims. (Cl. 260—47)

This invention relates to novel monotertiary-diprimary triamines and their use as curing agents for epoxy resins, and in particular, to such triamines having the formula

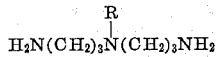

$$H_2N(CH_2)_3\overset{R}{N}(CH_2)_3NH_2$$

where R is an aliphatic hydrocarbon radical having from 12 to 22 carbon atoms.

It is known that epoxy resins having more than one oxirane group per molecule, can be cured with a wide variety of polyfunctional compounds to hard, insoluble and infusible products having many practical uses. Among such curing agents are the polyamides or/and polyamines. The aliphatic alkylene polyamines, such as ethylene-diamine, diethylene triamine, triethylene tetramine and the like, have generally been used for applications requiring curing at room temperature.

These alkylene polyamines, while having an advantageous low viscosity for use in many applications, possess, as a class, however, certain limitations such as:
(1) Short pot life.
(2) They are volatile and their fumes are both noxious and disagreeable.
(3) They are skin irritants, toxic penetrants and sensitizers.
(4) Epoxy resins cured with these alkylene polyamines tend to be brittle and frangible and lack impact resistance and flexibility.

Thus, the alkylene polyamines are not generally used in many applications, particularly where impact resistance and flexibility are desired, or where the toxic properties of the materials present a problem. In general, such polyamines have been used in a modified form such as the short chain alkyl derivatives or modified by reaction with acids such as the fatty acids and polymerized fatty acids to form mono- or polyamides. The short chain substituted products, while still retaining the low viscosity of the polyalkylene polyamines still retain, to a large extent, the toxicity and skin irritant problem and do not provide flexible and highly impact resistant products. In order to provide impact resistance and flexibility, resort was made to the long chain fatty substituted products such as the amino amides and amino polyamides prepared from monobasic fatty acids and polymerized fatty acids. However, in thus providing impact resistance and flexibility, such products were quite viscous and are thus limited, in some respects, in their application. Novel compounds have now been found which provide for the combination of impact resistance and flexibility of fatty substituted products such as the amino amides and polyamides and still retain the low viscosity substantially of the order of the short chain alkyl substituted polyamines and the polyamines themselves. In addition, such compounds are virtually non-toxic, non-skin-irritating, and non-sensitizing. Thus, novel compounds have been discovered which combine the desirable properties of previously known curing agents for epoxy resins. Such compounds provide the impact resistance and flexibility of the previously known fatty substituted products and yet retain the low viscosity of the short chain alkyl substituted products while being virtually nontoxic.

It is therefore an object of this invention to provide a novel compound having a low viscosity and substantially being nontoxic.

It is also an object of this invention to provide such a product which is useful for curing epoxy resins.

It is also an object of this invention to provide a hardenable mixture of such compounds with an epoxy resin which has a low viscosity, is substantially nontoxic, and which has a long pot life.

It is still further an object of this invention to provide a finally cured epoxy resin product.

The novel compound of the present invention, useful for curing epoxy resins, may be illustrated by the following formula: $RN(CH_2CH_2CH_2NH_2)_2$ in which R is an aliphatic hydrocarbon group containing from 12 to 22 carbon atoms. In general, the R group will be derived from the naturally occurring fatty acids such as oleic, lauric, linoleic, and the like, or mixtures thereof found in the fatty oils such as tallow oil, coconut oil, and the like. Where R is derived from a mixture of acids, such as tallow oil acids, R is defined in the usual manner by the source of the acids, such as tallow, coco, etc.

These compounds may be prepared in the conventional manner by a two-step process consisting of the preparation of the diadduct of acrylonitrile with a primary aliphatic amine in which the aliphatic group has from 12 to 22 carbon atoms followed by subsequent hydrogenation of the dinitrile product to the amine product.

The principal means of preparing the diadducts of acrylonitrile and the primary aliphatic amines consists in reacting an excess of acrylonitrile (two to ten times the theoretical amount) with the aliphatic amine in the presence of an acid catalyst within the temperature range of 60–100° C. In general, the relatively strong acids, such as acetic acid and phosphoric acid, are used in the dicyanoethylation process. In addition to the acidic catalysts, other non-acid catalysts may also be employed. The time of reaction depends largely on the particular catalysts used and the proportions thereof. In general, the time of reaction will be from seven to forty hours.

The polyamines of this invention are then obtained by the hydrogenation of the dinitriles. Any conventional hydrogenation technique may be employed which will reduce the nitrile groups. In general, the reduction is carried out in the presence of a catalyst, such as palladium or nickel, and in the presence of ammonia under superatmospheric conditions and at temperatures less than 100° C., in the range of 70–100° C., under pressure of hydrogen on the order of 700 to 1500 pounds per square inch gage. In general, about two mols of ammonia per mol of tertiary amine is employed. When using wet Raney nickel as a catalyst, the catalyst is used generally in an amount of about 10% by weight based on the amount of dinitrile.

The preparation of the acrylonitrile diadduct can best be illustrated by means of the following example:

Example 1

Ten equivalents of commercial distilled dodecyl amine (1970 grams), methanol (197 grams), 2.7 equivalents of acrylonitrile (1448 grams) and glacial acetic acid (39.4 grams) was stirred and heated under reflux for two and one-half hours. The stirrer was then stopped and the reaction allowed to stand at 47° C. for a total of 40 hours. The excess acrylonitrile, methanol and possibly some acetic acid were removed by heating the reaction product at 105° under a vacuum of 25 mm. The yield was 2990 grams (theory=3030 grams). As the diadduct is the tertiary amine present in the reaction mixture, the percent of diadduct present was determined by direct titration of the tertiary nitrogen atom. The tertiary amine content was 86%.

In a similar manner, the acrylonitrile diadduct may be formed from tallow amine, oleyl amine and similar fatty amines in which the fatty radical contains from 12 to 22 carbon atoms.

The acrylonitrile diadduct of fatty amine can then be hydrogenated as illustrated by means of the following example:

Example II

The following were charged to a one liter magnetically-stirred hydrogenation pressure vessel:

(1) 400 grams of an acrylonitrile diadduct of distilled tallow amine prepared by the procedure described in Example I. This diadduct had a tertiary amine content of 92%.

(2) 40 grams of wet Raney nickel catalyst (50% water).

(3) 10 mls. of methanol.

(4) 40 grams of ammonia.

The sealed vessel was pressurized with hydrogen to 1100 p.s.i. and then heated up to 90° C. while the contents were magnetically stirred for a total time of 5 hours. At this time the hydrogen consumption was down to zero. The vessel was cooled and vented. The contents were filtered warm to remove the catalyst. The yield of product was approximately 400 grams of a clear light-brown liquid that analyzed 90% tertiary amine and did not contain any nitrile groups as determined by the infrared spectra.

In a similar manner other monotertiary-diprimary amines have been prepared from various fatty amines. These are listed in the following table:

TABLE I.—MONOTERTIARY-DIPRIMARY AMINES

| Prepared From— | Percent Tertiary Amine | Percent Nitrile |
|---|---|---|
| Dodecyl amine | 90.2 | 0 |
| Coco amine | 84.3 | 0 |
| Hydrogenated tallow amine | 84.5 | 0 |
| Tallow amine | 86.0 | 0 |
| Oleyl amine | 93.0 | 0 |

As stated previously, the products are useful in the curing of epoxy resins, both the solid and liquid epoxide resins. While the properties of the specific products obtained may vary somewhat, dependent on the type of epoxy resin used, advantageous results are obtained through the use of the novel agent used in curing the resins. In general, the most commonly available epoxy resins are those which are the reaction products of epichlorohydrin and bis(parahydroxyphenyl) propane, "bisphenol A." Such resins have the following theoretical structural formula:

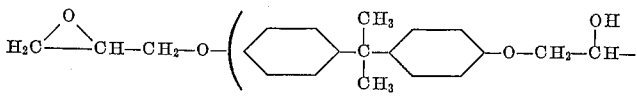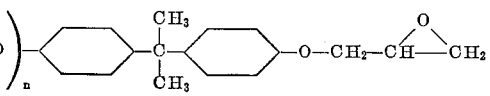

where $n$ is 0 or an integer up to 10. Generally speaking, $n$ will be no greater than 2 or 3, and is preferably 1 or less. However, other types of ejoxy resins may be employed.

Another of such epoxy resins are those which are the reaction product of epichlorohydrin and bis(parahydroxyphenyl) sulfone. Still another group of epoxy compounds which may be employed are the glycidyl esters of the polymeric fat acids. These glycidyl esters are obtained by reacting the polymeric fat acids with polyfunctional halohydrins such as epichlorohydrins. In addition, the glycidyl esters are also commercially available epoxide materials. As the polymeric fat acids are composed largely of dimeric acids, the glycidyl esters thereof may be represented by the following theoretical idealized formula:

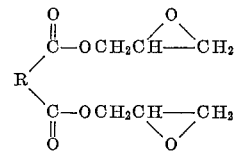

where R is the divalent hydrocarbon radial of dimerized unsaturated fatty acids.

The polymeric fat acids are well known materials, commercially available, which are the products from the polymerization of unsaturated fatty acids to provide a mixture of dibasic and higher polymeric fat acids. The polymeric fat acids are those resulting from the polymerization of the drying or semi-drying oils or the free acids or the simple aliphatic alcohol esters of such acids. Suitable drying or semi-drying oils include soybean, linseed, tung, perilla, oiticia, cottonseed, corn, sunflower, safflower, dehydrated castor oil and the like. The term "polymeric fat acids" as used herein and as understood in the art, is intended to include the polymerized mixture of acids which usually contain a predominant portion of dimer acids, a small quantity of trimer and higher polymeric fat acids and some residual monomers.

In general, the most readily available naturally occurring poly unsaturated acid available in large quantities is linoleic acid. Accordingly, it should be appreciated that polymeric fat acids will as a practical matter result from fatty acid mixtures that contain a preponderance of linoleic acid and will thus generally be composed largely of dimerized linoleic acid. However, polymerized fatty acids may be prepared from the naturally occurring fatty acids having from 8 to 22 carbon atoms. Illustrative thereof are oleic, linolenic, palmitoleic, and the like.

Other types of epoxy resins which may be cured with the present products and which are commercially available epoxy materials are the polyglycidyl ethers of tetraphenols which have two hydroxy aryl groups at each end of an aliphatic hydrocarbon chain. These polyglycidyl ethers are obtained by reacting the tetraphenols with polyfunctional halohydrins such as epichlorohydrin. The tetraphenols used in preparing the polyglycidyl ethers are a known class of compounds readily obtained by condensing the appropriate dialdehyde with the desired phenol. Typical tetraphenols useful in the preparation of these epoxy resins are the alpha, alpha, omega, omega-tetrakis (hydroxyphenol) alkanes, such as 1,1,2,2-tetrakis(hydroxyphenol)ethane, 1,1,4,4 - tetrakis(hydroxyphenol) butane, 1,1,4,4 - tetrakis(hydroxyphenol) - 2 - ethylbutane and the like. The epoxy resin reaction product of epichlorohydrin and tetraphenol may be represented by the following theoretical structural formula:

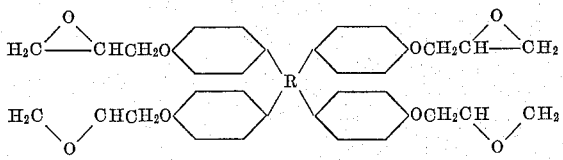

where R is a tetravalent aliphatic hydrocarbon chain having from 2 to 10, and preferably, from 2 to 6, carbon atoms.

Still another group of epoxide materials are the epoxidized novolac resins. Such resins are well known substances and readily available commercially. The resins may be represented by the following theoretical idealized formula:

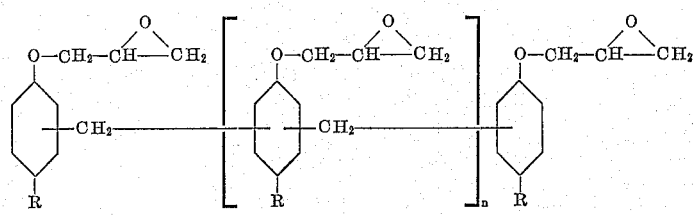

where R is selected from the group consisting of hydrogen and alkyl groups having up to 18 carbon atoms, and $n$ is an integer from 1 to 5. In general, $n$ will be an integer in excess of 1 to about 3.

In general, these resins are obtained by epoxidation of the well-known novolac resins. The novolac resins, as is known in the art, are produced by condensing the phenol with an aldehyde in the presence of an acid catalyst. Although novolac resins from formaldehyde are generally employed, novolac resins from other aldehydes such as, for example, acetaldehyde, chloral, butyraldehyde, furfural, and the like, may also be used. The alkyl group, if present, may have a straight or a branched chain. Illustrative of the alkylphenol from which the novolac resins may be derived are cresol, butylphenol, tertiary butylphenol, tertiary amylphenol, hexylphenol, 2-ethylhexylphenol, nonylphenol, decylphenol, dodecylphenol, and the like. It is generally preferred, but not essential, that the alkyl substituent be linked to the para-carbon atom of the present phenolic nucleus. However, novolac resins in which the alkyl group is in the ortho position have been prepared.

The epoxidized novolac resin is formed in the well-known manner by adding the novolac resins to the epichlorohydrin and then adding an alkali metal hydroxide to the mixture so as to effect the desired condensation reaction.

In addition, other epoxy resins which may be cured with the curing agents of the present invention are the glycidyl ethers of the polyalkylene glycols, epoxidized olefins such as epoxidized polybutadiene and epoxidized cyclohexanes.

In general, the epoxy resins may be described as those having terminal epoxide groups.

In addition, the epoxy resins may be characterized further by reference to their epoxy equivalent weight, the epoxy equivalent weight of pure epoxy resin being the mean molecular weight of the resins divided by the mean number of epoxy radicals per molecule, or in any case, the number of grams of epoxy resin equivalent to one epoxy group or one gram equivalent of epoxide. The epoxy resinous materials employed in this invention have an epoxy equivalent weight of from about 140 to about 2,000.

Because the products of the invention, useful as curing agents for epoxy resins, are liquid and have low viscosity, they are particularly suitable for curing liquid epoxy resins for use in applications where liquid resins of low viscosity must be used. The liquid epoxy resins will have epoxy equivalent weights in the range of about 140 to 300. In general, epoxy resins having epoxy equivalent weights above 300 are solid epoxy resins.

As stated, the curing agents of the present invention find particular application with liquid epoxy resins. One type of application which requires the use of liquid resins, preferably of low viscosity, is the protective coating industry, and particularly, in 100% solvent-free solid coatings. The protective coatings industry desires coating materials, especially for maintenance paints, which may be applied by brush, spray gun, or other methods in thick films to achieve maximum durability and corrosion resistance, decorative appearance, minimum application costs, and reduced fire hazard. In solventless coatings, of course, the fire hazard is virtually nonexistent. Since most coatings require the penetration of oxygen for curing and/or evaporation of a solvent, the preparation of smooth, strong films of greater than about three mils thick in one application is difficult. Other solvent free 100% solids coatings, that do not require oxygen for curing, have inherent disadvantages, some of which are given below:

(1) Polyesters (phthalic-maleic-glycol-styrene) tend to be brittle or poor drying, have coating irregularities, and require small accurately measured amounts of touchy peroxide catalysts.

(2) Fluid epoxy resins with simple polyamines require accurate measurement of the relatively toxic polyamines and have short pot life. Mechanical metering is difficult. These coatings also tend to have irregularities and lack flexibility, and have only fair water resistance.

(3) Combinations of fluid epoxy resins with aminoamide compounds or adducts of an excess of a polyamine with a fluid epoxy resin give solvent free coatings with some useful properties but are much too viscous for brush or normal spray gun application.

(4) Asphalts and several other types of materials require heat for application, tend to be very viscous systems, and lack variability in pigmentation.

Unlike the above types of solvent free coatings, the new composition described here yields room temperature cured coatings with these good properties; hardness of baked enamels, high resistance to strong acids and solvents, low enough viscosity to be applied with a brush—even when used with epoxy resins with a viscosity of about 140 poises, almost water white color, ability to cure overnight at room temperature but with a comparatively long pot or working life, defect free surfaces when dried at 50% relative humidity, and fair to good impact resistance or flexibility.

Since the viscosity range of a solvent free coating must be suitable for the method of application, a consideration of the proper viscosity for brushable coatings or paints is necessary. Clear varnishes may be brushed over a wide range of viscosity from perhaps C to T (Gardner-Holdt). A normal range for a brushing gloss enamel is 67 to 77 KU. A lightly pigmented 100% solids gloss enamel with a vehicle viscosity of U had a Krebs Stormer viscosity of 83 KU. Paints of higher viscosity still may be brushed provided the increased KU viscosity is due primarily to an increased yield value induced by pigmentation or antisag agents.

Table I compares the coating properties of combinations of a typical liquid epoxy resin with the monotertiary-diprimary fatty amines of this invention with and without a modifier and of a similar combination containing a commercial amino-amide product of relatively low viscosity. The combinations listed were mixed, allowed to stand ten minutes, applied to tin plate and glass panels with a doctor blade so that films of similar thickness were compared. The coatings were dried in a constant temperature (73° F.) and humidity (50%) room and tests made as indicated in the table.

The table indicates that combinations containing the monotertiary-diprimary amines used in coatings 1 to 4 are superior to coating 5 in several respects:

(1) Are much lower in viscosity, and as indicated in the discussion above, are suitable for brush application.
(2) Gel times or times that they may be used are much longer 126, 140 vs. 60 min.
(3) Flexibility is higher as shown by impact resistance and mandrel bend tests after seven days dry.
(4) Much lighter color.

The curing agent of this invention is preferably used in ratios by weight of curing agent to liquid epoxy resin of from about 25/75 to 40/60. While the foregoing Table I shows the use of the tallow acids product, other fatty acids, such as the coconut oil fatty acids, tall oil fatty acids, and oleic acid, may be used.

Smooth glossy coatings are also produced when these coatings are cured at the elevated temperatures of 100 to 300° F. or in the absence of air.

Liquid modifiers such as triphenyl phosphite (Mod-Epox), a tertiary amine (DMP30), nonyl phenol, and flow control agents such as silicone resins and oils may be used to achieve quicker curing or smoother films when dried under adverse conditions. Liquid plasticizers such as dibutyl phthalate may be added. The addition of judicious amounts of triphenyl phosphite or fluid plasticizers would reduce viscosity further to facilitate handling. Small amounts of solvents may be used to secure even lower viscosity, but of course, the combination would not then be solvent free.

Solid modifiers may be used such as pigments and fillers normally used in paints, or sand which might be added to produce trowelling concrete toppings or floor coatings. Treated clays and amorphous silica may be used to secured non-sagging thick coatings for vertical surfaces.

As previously indicated, the curing agent of the present invention may also be used in combination with the solid epoxy resins. In combination with the solid epoxy resins, generally the solid epoxy resin is dissolved in the usual solvents therefor, such as methylisobutyl ketone and mixtures thereof with xylene such as a 50/50 ratio of xylene and methylisobutyl ketone. The following Table III will illustrate the curing of solid epoxy resins with the curing agents of the present invention.

TABLE II.—SOLVENT FREE COATINGS

| Coating | Composition, parts by weight | | Viscosity, Gardner-Holdt | | |
|---|---|---|---|---|---|
| | Curing[1] Agent | Epoxy[2] Resin | 10 min. After Mix | 60 min. After Mix | Gel Time 50 gm. mix (minutes) |
| 1 | 30 | 70 | T+ | Y+ | 126 |
| 2 | 35 | 65 | N | U | 140 |
| 3 | 30 | 70 | T | W | 250 |
| 4 | 35 | 65 | N | U | 240 |
| 5 | 30 | 70 | Z | Gel | 100 |

| Coating | Hardness, 3 mil film | | Flexibility | | |
|---|---|---|---|---|---|
| | 1 day dry, Sward Rocker | 7 day dry, Sward Rocker | Impact Resistance inch-pounds 31 gauge tin | | Bend Over Rod Diameter |
| | | | 1 day dry | 7 day dry | 7 day dry |
| 1 | 22 | 50 | 30–60 | 4–8 | OK ⅛ in. |
| 2 | 19 | 36 | 30–60 | 16–30 | OK ⅛ in. |
| 3 | 35 | 51 | 8–16 | 4–8 | OK ⅛ in. |
| 4 | 40 | 49 | 8–16 | 4–8 | OK ⅛ in. |
| 5 | 14 | 52 | 2–4 | 2– | Failed ¼ in. |

[1] Curing Agents:
Coatings 1 and 2—the curing agent was an amine having the formula $RN(CH_2CH_2CNH_2)_2$ where R is a tallow acid radical.
Coatings 3 and 4—the curing agent was an amine having the same formula but R being a distilled tallow acid radical.
Coating 5—the curing agent was an aminoamide of tall oil acids and tetraethylene pentamine having a viscosity of 5–10 poises.
[2] Epoxy resin of bisphenol A and epichlorohydrin having epoxy equivalent weight of about 190 and a viscosity of about 140 poises.

TABLE III.—SOLVENT COATINGS—SOLID EPOXY RESIN

| Coating | Composition parts by weight | | Viscosity (Gardner-Holdt) at 63% solids after mixing | | | Hardness-Sward Rocker | | | Impact Resistance, inch-pounds | | |
|---|---|---|---|---|---|---|---|---|---|---|---|
| | [1] Curing Agent | [2] Epoxy Resin | 10 min. | 8 hrs. | 24 hrs. | Dried | | Baked 10 min. at 300° F. | Dried | | Baked |
| | | | | | | 1 Day | 7 Days | | 1 Day | 7 Days | |
| 1 | 10 | 90 | W | Z3 | Gel | 16 | 61 | 77 | 60+ | 60+ | 60+ |
| 2 | 13 | 87 | W | Z5 | Gel | 16 | 52 | 71 | 60+ | 60+ | 60+ |
| 3 | 16 | 84 | W | Z6 | Gel | 14 | 44 | 68 | 60+ | 60+ | 60+ |

[1] Curing agent was amine having formula $RN(CH_2CH_2CNH_2)_2$ where R is a tallow acid radical.
[2] Epoxy resin of bisphenol A and epichlorohydrin having an epoxy equivalent weight of about 500.

Table II shows that good appearing, hard, impact and chemically resistant coatings may be made from the monotertiary-diprimary fatty amine.

In addition to being used as a curing agent for epoxy resins in the formation of coatings, the curing agent of the present invention also finds use in curing epoxy resins for applications such as adhesives, castings and laminates.

Properties of a combination of the monotertiary-diprimary fatty amine, $RN(CH_2CH_2CH_2NH_2)_2$ where R is a tallow acid radical, with a liquid epoxy resin, indicate its usefulness in adhesives, castings, or laminates. A combination of 30 parts by weight of the amine with 70 parts of a liquid epoxy resin with an epoxy equivalent weight of 190 was cured one hour at 300° F. It had the following properties:

Shrinkage, percent=0.7
Flexural deformation temperature °C.=48
Hardness, Barcol=46
Impact, falling ball, lbs. (3 ft.)=3.98
Flexural strength, p.s.i.=6900
Flexural modulus, p.s.i.=$2.1 \times 10^5$
Tensile strength, p.s.i.=3600
Water absorption, 24 hours, percent by wt.=0.67

In addition, pot life and exotherm studies show that a 200 gram quantity gels in 41 minutes and reaches a maximum temperature of 160° C.

It is to be understood that the invention is not to be limited to the exact details of operation or the exact compounds shown and described, as obvious modifications and equivalents will be apparent to those skilled in the art and the invention is to be limited only by the scope of the appended claims.

The embodiments of the invention in which an exclusive property or privilege is claimed are defined as follows.

What is claimed is:

1. A hardenable composition of an epoxy resin having terminal 1,2-epoxide groups and a monotertiary-diprimary amine having the formula $RN(CH_2CH_2CH_2NH_2)_2$ where R is an aliphatic hydrocarbon radical having from 12 to 22 carbon atoms in an amount reactive with said epoxy resin to form a hard, infusible and insoluble product.

2. A hardenable composition as defined in claim 1 wherein said epoxy resin has an epoxy equivalent weight of from about 140 to 2000.

3. A hardenable composition as defined in claim 1 wherein said epoxy resin has an epoxy equivalent weight of about 140 to 300.

4. A hardenable composition as defined in claim 1 wherein the epoxy resin is a polyglycidyl ether of dihydric phenol.

5. A cured composition comprising the reaction product of an epoxy resin having terminal 1,2-epoxide groups and a monotertiary-diprimary amine of the formula $RN(CH_2CH_2CH_2NH_2)_2$ where R is an aliphatic hydrocarbon radical having from 12 to 22 carbon atoms.

6. A cured composition as defined in claim 5 wherein the epoxy resin has an epoxy equivalent weight of from about 140 to 2000.

7. A cured composition as defined in claim 5 wherein the epoxy resin has an epoxy equivalent weight of about 140 to 300.

8. A process of curing an epoxy resin having terminal 1,2-epoxide groups comprising mixing said epoxy resin with a monotertiary-diprimary amine of the formula $RN(CH_2CH_2CH_2NH_2)_2$ where R is an aliphatic hydrocarbon radical having from 12 to 22 carbon atoms.

9. A process as defined in claim 8 wherein said epoxy resin has an epoxy equivalent weight of about 140 to 2000.

10. A process as defined in claim 8 wherein said epoxy resin is a liquid epoxy resin having an epoxy equivalent weight of about 140 to 300.

References Cited by the Examiner

UNITED STATES PATENTS

| | | | |
|---|---|---|---|
| 2,681,935 | 6/1954 | Thompson | 260—583 |
| 3,048,620 | 8/1962 | Spivack | 260—47 |

OTHER REFERENCES

Grant, "Hackh's Chemical Dictionary," third edition, page 829, relied on, The Blakiston Company, Philadelphia, 1944.

WILLIAM H. SHORT, *Primary Examiner.*

HAROLD N. BURSTEIN, SAMUEL H. BLECH,
*Examiners.*

P. H. HELLER, T. D. KERWIN, *Assistant Examiners.*